March 21, 1967  G. D. BYNUM ET AL  3,309,734

SPINNERETTE

Filed July 27, 1964

INVENTORS
GEORGE D. BYNUM
NORMAN D. SIMS
BY
ATTORNEY

United States Patent Office 3,309,734
Patented Mar. 21, 1967

3,309,734
SPINNERETTE
George D. Bynum, Decatur, and Norman D. Sims, Trinity, Ala., assignors to Monsanto Company, St. Louis, Mo., a corporation of Delaware
Filed July 27, 1964, Ser. No. 385,177
7 Claims. (Cl. 18—8)

The present invention relates to spinnerettes and, more particularly, the invention relates to apparatus used in the production of filamentary materials having novel cross-sectional areas.

It is a primary object of the present invention to provide apparatus which may be used for extruding filament-forming synthetic materials.

Another object of the present invention is to provide a spinnerette for extruding monofilaments which are comprised of a multitude of loosely bonded fibrils co-extensively aligned with the longitudinal axis of the monofilament.

A specific object of the present invention is to provide a novel apparatus for extruding a viscous melt of acrylonitrile polymer and water through said apparatus to form filamentary materials having novel cross sections.

Other objects of the invention will be apparent from the following detailed description and the accompanying drawing.

According to the present invention there is provided a tubular member having a first chamber for introducing a source of pressurized steam, a spinnerette disc having a plurality of holes passing through the disc at an angle with the surface thereof to permit extruding into said chamber a viscous melt, and a second chamber coextensively aligned with the first chamber and reduced in diameter to increase the velocity of the steam which facilitates the removal of filamentary material from the tubular member. By "viscous melt" is meant dispersed polymer particles suspended in a non-solvent solution when subjected to suitable heat and pressure. The velocity of the steam, which is directed laterally against the extruded material, imposes a drawing force upon the extrusions and stretches them to form molecularly oriented monofilaments comprised of loosely bonded fibrils.

For a better understanding of the process in which the present invention is employed, reference should be made to copending application Ser. No. 369,225 filed on May 19, 1963.

One embodiment contemplated by the present invention is an elongated rectangular member having a cylindrical passageway extending through the major portion of said member and an inlet passageway intersecting the cylindrical passageway. A flat spinnerette disc having a plurality of angled holes therein is positioned in the inlet passageway near the cylindrical passageway and is parallel with the wall thereof.

A modification of the above embodiment contemplates a perforated cylindrical sleeve inserted in an enlarged cavity which extends beyond the inlet in both directions to form a portion of the cylindcrical passageway.

Figure 1:
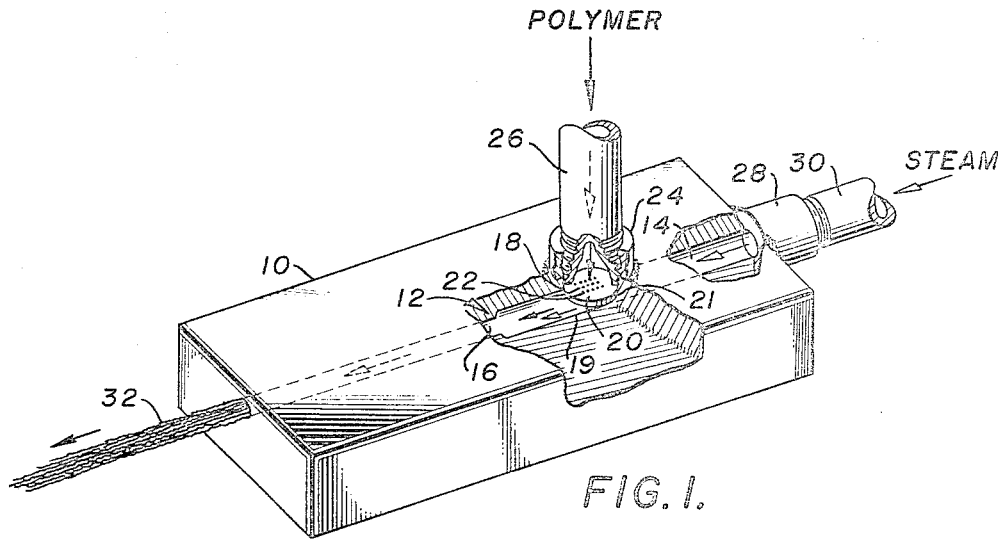
Figure 2:
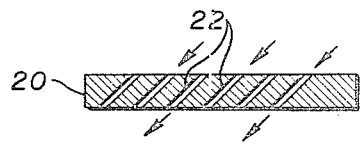
Figure 3:
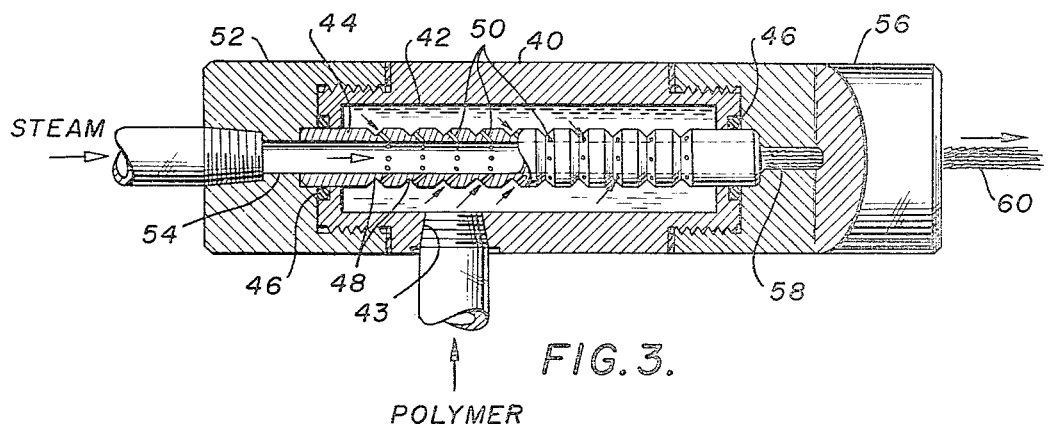

A better understanding of the invention may be had by referring to the accompanying drawing, in which FIGURE 1 is a perspective view of the apparatus with a portion thereof broken away to show the spinnerette disc and its arrangement;

FIGURE 2 is a cross-sectional view of the spinnerette disc shown in FIGURE 1; and FIGURE 3 is a cross-section of a modified form of the invention.

Referring now in detail to the drawing, there is shown in FIGURE 1 a rectangular base member 10 having a passageway 12 extending through the length. thereof The passageway 10 is divided into a first section which forms a chamber 14 and a reduced section 16. Positioned intermediate the chamber 14 is an opening 18 having a spinnerette disc 20 disposed therein, the major plane being parallel and flush with the wall 19 of the chamber. A shoulder 21 is formed in base member 10 to accommodate disc 20. The disc 20 has therein a plurality of holes 22, drilled 0.015 inch in diameter at at an angle of 45 degrees as shown in FIGURE 2. A boss 24 is mounted on rectangular member 10 concentric with the opening 18 for receiving a tubular member 26 which holds the disc 20 in place and a boss 28 is mounted on rectangular member 10 concentric with chamber 14 for receiving a tubular member 30.

Filamentary material is produced by introducing a polymeric solution or viscous melt under pressure (from a source not shown) through inlet 26 and a source of steam (not shown) through inlet 30. The viscous melt is extruded through the orifices 22 and into contact with a high velocity stream of steam in chamber 14. After being exposed for a short interval to the humidity and heat of the steam, the extruded material is ejected through the reduced section 16 in the form of monofilaments 32 having novel cross-sections.

In FIGURE 3 there is shown another embodiment of the invention in which a tubular member 40 has a chamber 42 therein and an opening in each end and one side thereof. The openings at the ends of the chamber are provided to receive a hollow member 44, referred to hereafter as a spinnerette, which is disposed along the longitudinal axis of chamber 42. A seal between the spinnerette and the walls of the openingis is provided by O-rings 46. The spinnerette 44 has a series of V-shaped grooves 48 cut around the circumference to form flat surfaces which have a plurality of 0.015 inch in diameter holes 50 drilled perpendicularly therein and at approximately 45 degree angle with the inside wall of the tubular member. A cap 52 having a hole 54 passing through the center thereof is connected by screw threads to one end of member 40. A member 56 having a reduced bore 58 is similarly connected to the other end of member 40. The hollow member or spinnerette 44 is held in place by the end members 52 and 56.

Referring to the apparatus illustrated by FIGURE 3, a polymeric material is introduced under pressure through inlet 43 into chamber 42 and spinnerette 44 is completely immersed therein. The polymeric material is extruded through several orifices 50 and into contact with a source of steam entering through inlet 54. The extruded material is discharged through the outlet 58 in the form of several monofilaments 60 having novel cross sections.

Since it is apparent that changes and modifications can be made in the above-described detailed specification without departing from the scope of the invention, it is to be understood that the invention is not to be limited except as set forth in the claims.

We claim:

1. Apparatus for producing filamentary materials, which comprises:
    (a) a base member having a passageway extending throughout the major axis thereof, said passageway being divided into two portions having substantially different size diameters, said portions being connected by an abrupt shoulder,
    (b) an inlet in the base member positioned intermediate the passageway portion having the larger diameter,
    (c) an orificed element mounted in the base member, said element having small holes at an angle to the axis of the passageway for communication between the inlet and the passageway portion having the larger diameter, (d) a first connection means for supplying a source of a filament-forming material to the inlet, and
(e) a second connection means connected to said larger diameter passageway portion upstream from the point where filament-forming material enters the passageway for supplying a fluid under pressure whereby the filament-forming material is forced through the smaller portion of the passageway.

2. The apparatus of claim 1 wherein the small holes are approximately 0.015 inch in diameter.

3. The apparatus of claim 2 wherein the angle of the holes with respect to the axis is approximately 45 degrees.

4. The apparatus of claim 1 wherein the orificed element is a disc aligned with the passageway to form a wall portion thereof.

5. The apparatus of claim 1 wherein the orificed element is cylindrical.

6. The apparatus of claim 5 wherein the cylindrical element is centrally disposed in the chamber.

7. The apparatus of claim 6 wherein the passageway is centrally disposed in said cylindrical element.

References Cited by the Examiner

UNITED STATES PATENTS

| | | | |
|---|---|---|---|
| 204,227 | 5/1878 | Hyott | 18—13 |
| 1,419,090 | 6/1922 | Williams | 18—13 |
| 2,046,577 | 7/1936 | Sellner et. al. | 18—8 |
| 2,075,867 | 4/1937 | Sampel | 259—4 X |
| 2,286,922 | 6/1942 | Muller | 18—13 |
| 2,776,119 | 1/1957 | Joffe et al. | 259—4 |
| 3,147,955 | 9/1964 | Harvey et al. | 259—4 |
| 3,152,362 | 10/1964 | Carter | 18—8 |
| 3,208,829 | 9/1965 | Terenzi | 18—12 X |

WILLIAM J. STEPHENSON, *Primary Examiner.*